United States Patent Office 3,829,503
Patented Aug. 13, 1974

3,829,503
PROCESS FOR PRODUCING ORGANIC PEROXIDES
Mitsukuni Kato, Yokohama, and Takeshi Komai and Kazuyoshi Aoshima, Taketoyo-machi, Japan, assignors to Nippon Oils and Fats Company Limited, Tokyo, Japan
No Drawing. Filed July 20, 1970, Ser. No. 56,711
Claims priority, application Japan, July 19, 1969, 44/56,755
Int. Cl. C07c 73/00
U.S. Cl. 260—610 R                     6 Claims

ABSTRACT OF THE DISCLOSURE

An aromatic group-containing tertiary peroxide can be produced by reacting an aromatic group-containing tertiary hydrocarbon halide with a tertiary hydroperoxide under a reduced pressure or in the presence of a tertiary alkanol or an alkene olefin. Said tertiary peroxide is useful as a radical initiator for vinyl monomers and a cross-linking agent for pololefins.

The present invention relates to a process for producing organic peroxides, particularly aromatic group-containing tertiary peroxide, which are useful as a radical initiator for vinyl monomers and a cross-linking agent for polyolefins.

There have hitherto been known two fundamental processes in the production of aromatic group-containing tertiary peroxides. There is described in Japanese Patent Application Publication No. 16,719/62 that an aromatic group-containing tertiary alcohol is reacted with a tertiary hydroperoxide in the presence of an acidic catalyst. Further, there is described in Japanese Patent Application Publication No. 2,458/64 that an aromatic group-containing olefin is reacted with a tertiary hydroperoxide in the presence of an acidic catalyst.

However, these processes have various drawbacks. In the former process, since the reaction is carried out in the presence of an acidic catalyst, the tertiary hydroperoxide is decomposed, and the yield of the desired product is low. Moreover, since the aromatic group-containing tertiary alcohol is prepared by reducing the corresponding tertiary hydroperoxide, the preparation step is complicated. In the latter process the aromatic group-containing olefin is prepared by dehydrogenation of the corresponding saturated hydrocarbon, and such a process is expensive in the small scale production.

In order to solve the above-described disadvantages, the inventors have made various investigations for producing aromatic group-containing tertiary peroxides, and accomplished the present invention.

The present invention comprises a process for producing organic peroxides characterized by reacting an aromatic group-containing tertiary hydrocarbon halide, in which the tertiary hydrogen atom is substituted with a halogen atom, with a tertiary hydroperoxide under a reduced pressure or in the presence of a tertiary alcohol or an aliphatic olefin.

Such a reaction is shown by the following formulae

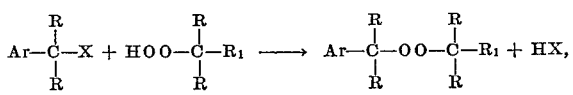

and

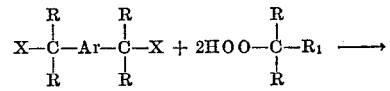

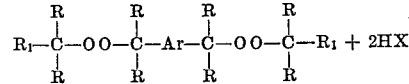

In the formulae, X is a chlorine or bromine atom, Ar is an aromatic group, which may be substituted, R is same or different aliphatic hydrocarbon group and $R_1$ is an aromatic or aliphatic hydrocarbon group.

The above-described halide includes chlorides or bromides of cumene, diisopropylbenzene, cymene, etc., in which the tertiary hydrogen atom is substituted with a chlorine or bromine atom.

The tertiary hydroperoxide includes aliphatic and aralkyl tertiary hydroperoxides, such as tert-butyl hydroperoxide, tert-amyl hydroperoxide, tert-hexy hydroperoxide, 1,1,3,3-tetramethylbutyl hydroperoxide, 2,5 - dimethylhexane, 2,5 - dihydroperoxide, 2,5 - dimethylhexyne, 2,5-dihydroperoxide, cumene hydroperoxide, diisopropylbenzene dihydroperoxide, etc. A mole ratio of the above described monohalide to the above hydroperoxide to be used in this reaction is 1:1.0–1.5 and a mole ratio of the above described dihalide to the above hydroperoxide is 1:2.0–3.0.

The reaction of the present invention is preferably carried out under a reduced pressure or in the presence of a compound reacting with hydrogen halide. When these reactants are directly reacted, the by-produced hydrogen halide decomposes the resulting peroxide and the starting hydroperoxide, and further the resulting peroxide is colored dark brown. However, the reaction proceeds smoothly under a reduced pressure or in the presence of a compound reacting with hydrogen halide, and an extraordinary exothermic decomposition and the coloration of the resulting peroxide do not occur.

The compounds reacting with hydrogen halide include alkenes and tertiary alkanols, such as diisobutylene, 2-methylpentene-1, isobutylene, tert-butanol, tert-amyl alcohol, etc.

The reaction of the present invention is preferably carried out at about 0–80° C., 40–50° C. Further, in the reaction, the halogen compound may be added to the hydroperoxide or inversely the hydroperoxide may be added to the halide.

The following examples are given in illustration of this invention and are not intended as limitations thereof.

Example 1.—Cumyl-tert-butyl peroxide

Into a mixture of 40 g. (purity 83%, 0.37 mole) of commercial tert-butyl hydroperoxide and 40 g. of 2-methylpentene-1 was added dropwise with stirring 47 g. (0.3 mole) of cumyl-chloride. During the addition the resulting mixture was kept at 40° C.

After the addition, the mixture was stirred for 1 hour at this temperature.

The reaction mixture was washed once with a 5% aqueous solution of sodium hydroxide and twice with water and then dried with anhydrous magnesium sulfate. The resulting peroxide solution was placed under reduced pressure (5 mm. Hg, 60° C.) to remove the residual reactants and the resulting impurities and to obtain 50 g. of a light yellow cumyl-tert-butyl peroxide.

| | Percent |
|---|---|
| Purity by gas chromatography | 95 |
| Yield | 75.5 |

Example 2.—Cumyl-tert-butyl peroxide

Into 40 g. (purity 83%, 0.37 mole) of commercial tert-butyl hydroperoxide was added dropwise with stirring 47 g. (0.3 mole) of cumyl chloride. During the addition, the resulting mixture was kept at 40° C. In this case, hydrogen chloride gas generated was removed under a reduced pressure of about 100 mm. Hg by means of a water-jet pump. After the addition, the reaction mixture was stirred for 1 hour at this temperature, and the resulting peroxide was washed once with a 5% aqueous solution of sodium hydroxide and twice with water, and then dried with anhydrous magnesium sulfate, and thereafter, placed under a reduced pressure of 5 mm. Hg by means of a rotary evaporator at 60° C. to remove the residual reactants and the resulting impurities and to obtain 36 g. of a yellow cumyl-tert-butyl peroxide.

| | Percent |
|---|---|
| Purity by gas chromatography | 94 |
| Yield | 60.2 |

Example 3.—2,5-di(cumyl peroxy) 2,5-dimethylhexane

Into a mixture of 30 g. (0.16 mole) of 2,5-dimethylhexane 2,5-dihydroperoxide and 50 g. of tertiary butanol was added with stirring 52 g. (0.33 mole) of cumyl chloride. During the addition, the resulting mixture was kept at 40° C. After the addition, the reaction mixture was stirred for 1 hour at this temperature, and 100 cc. of ether was added thereto. The reaction mixture was washed once with a 5% aqueous solution of sodium hydroxide and twice with water and then dried with anhydrous magnesium sulfate.

Then, the reaction mixture was placed under reduced pressure to remove ether and crystallized from 50 cc. of methanol at −20 ° C. to obtain 30 g. of a white powder.

| | |
|---|---|
| Melting point | ° C.  55 |
| Yield | percent  45.5 |
| Molecular weight: | |
| Found value | 418 |
| Calculated value | 414 |

Example 4.—2,5-di(cumyl peroxy) 2,5-dimethylhexyne

Into a mixture of 30 g. (purity 90%, 0.16 mole) of 2,5-dimethylhexyne 2,5-dihydroperoxide and 50 g. of tertiary butanol was added with stirring 52 g. of cumyl chloride. During the addition the resulting mixture was kept at 40° C. The reaction mixture was treated in the same manner as described in Example 3 to obtain 28 g. of a white powder.

| | |
|---|---|
| Melting point | ° C.  58 |
| Molecular weight: | |
| Found value | 412 |
| Calculated value | 410 |

Example 5.—Dicumyl peroxide

Into a mixture of 52 g. of cumyl chloride and 70 g. of diisobutylene was added with stirring 65 g. (purity 80%, 0.34 mole) of commercial cumene hydroperoxide. During the addition the resulting mixture was kept at 40° C. After the addition, the reaction mixture was stirred for 2 hours, washed once with a 5% aqueous solution of sodium hydroxide and twice with water, and then dried with anhydrous magnesium sulfate. Next, the reaction mixture was placed under reduced pressure to remove diisobutylene and hydrochloride therefrom and crystallized from 50 cc. of methanol while maintaining the temperature at −20° C. to obtain dicumyl peroxide.

| | |
|---|---|
| Yield | g.  30 |
| Purity | percent  99.0 |

Example 6.—α,α'-Bis(tert-butyl peroxy) p-diisopropyl benzene

Into a mixture of 40 g. of (α,α'-dibromo)p-diisopropyl benzene and 60 g. of 2-methyl pentene-1 was added with stirring 40 g. of tert-butyl hydroperoxide. During the addition, the resulting mixture was kept at 40° C. Then the reaction mixture was treated in the same manner as described in Example 5 to obtain 25 g. of a crystalline product.

| | |
|---|---|
| Melting point | ° C.  75 |
| Molecular weight: | |
| Found value | 340 |
| Calculated value | 338 |

As described above, according to the present invention organic peroxides can be prepared in a high yield without decomposition of hydroperoxide by reacting a halide of aromatic group-containing tertiary hydrocarbon with a tertiary hydroperoxide under reduced pressure or in the presence of a tertiary alkanol or an alkene.

According to the present invention, the coloration of the resulting organic peroxides is low and the amount of by-products is small. These organic peroxides are suitable for use as a polymerization initiator for vinyl monomers or as a cross-linking agent for olefin polymers.

What is claimed is:

1. A process for producing an organic peroxide which comprises reacting (1) an aromatic group-containing tertiary hydrocarbon halide selected from the group consisting of cumene, diisopropyl benzene and cymene, the tertiary hydrogen atom of which is substituted with chlorine or bromine with (2) a tertiary hydroperoxide selected from the group consisting of tert-butyl hydroperoxide; tert-amyl hydroperoxide; tert-hexyl hydroperoxide; 1,1,3,3-tetramethylbutyl hydroperoxide; 2,5-dimethylhexane 2,5-dihydroperoxide; 2,5 - dimethylhexyne 2,5 - dihydroperoxide; cumene hydroperoxide and diisopropylbenzene dihydroperoxide at a temperature of 0 to 80° C. in the presence of a tertiary alkanol or an alkene, the mole ratio of said monohalide to said hydroperoxide being 1:1–1.5 and the mole ratio of said dihalide to said hydroperoxide being 1:2.0–3.0.

2. The process as claimed in claim 1, wherein said tertiary, alkanol is tert-butanol or tert-amyl alcohol.

3. The process as claimed in claim 1, wherein said alkene is diisobutylene, 2-methylpentene-1 or isobutylene.

4. A process according to claim 1 wherein the aromatic-group containing tertiary hydrocarbon halide is

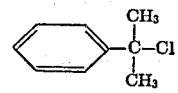

5. A process according to claim 4 wherein the tertiary hydroperoxide is tert-butyl hydroperoxide.

6. A process according to claim 4 wherein the tertiary hydroperoxide is cumene hydroperoxide.

References Cited

UNITED STATES PATENTS

| 3,505,363 | 4/1970 | Milas | 260—610 R |
| 2,644,014 | 6/1953 | Saunders | 260—610 R |
| 2,813,127 | 11/1957 | White | 260—610 R |

BERNARD HELFIN, Primary Examiner

W. B. LONE, Assistant Examiner